United States Patent [19]

Huneke

[11] Patent Number: 4,580,912
[45] Date of Patent: Apr. 8, 1986

[54] BEARING OIL SUPPLY FILTER-CONTROL APPARATUS FOR A ROTATING MACHINE

[75] Inventor: Charles F. Huneke, Creve Coeur, Mo.

[73] Assignee: Westinghouse Electric Corp., Pittsburgh, Pa.

[21] Appl. No.: 745,744

[22] Filed: Jun. 17, 1985

[51] Int. Cl.$^4$ .............................................. F16C 33/66
[52] U.S. Cl. .................. 384/322; 384/473; 210/299
[58] Field of Search ............... 384/322, 473, 373, 398; 210/299, 303, 305

[56] References Cited

U.S. PATENT DOCUMENTS

| | | | |
|---|---|---|---|
| 2,101,211 | 12/1937 | Britton | 210/299 |
| 2,576,470 | 11/1951 | May | 210/299 |
| 3,237,769 | 3/1966 | Humbert | 210/299 |
| 4,188,078 | 2/1980 | Bolton et al. | 384/473 |

Primary Examiner—Lenard A. Footland
Attorney, Agent, or Firm—R. S. Lombard

[57] ABSTRACT

A retrofit bearing oil supply filter-control apparatus for a rotating machine is disclosed. The filter-control apparatus may be installed in existing or new bearing oil systems. The apparatus includes a hollow flow-control block having a central cavity therein. The central cavity has an inlet in fluid communication with an oil supply and an outlet in fluid communication with the bearing.

The apparatus also includes a removable oil flush deflector inserted in the central cavity. The oil flush deflector is inserted during an oil flush to prevent oil containing damaging particles from reaching the bearing. The apparatus also includes a removable oil filter that is inserted in the central cavity during normal operation. The oil filter catches damaging particles entrained in the oil and prevents them from reaching the bearing.

7 Claims, 7 Drawing Figures

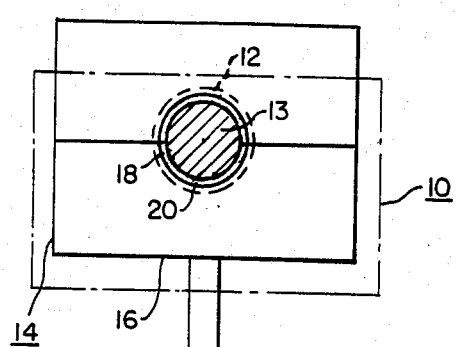
FIG. 1.
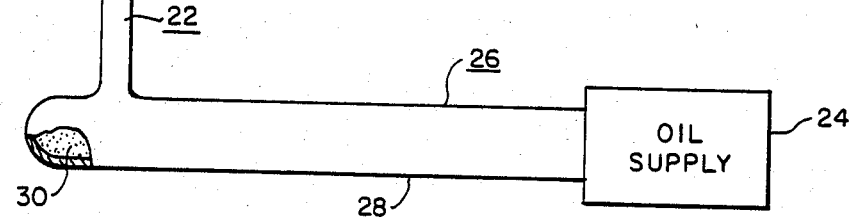
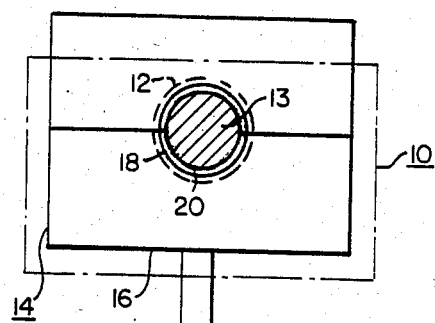
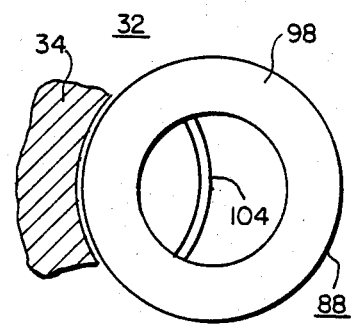
FIG. 2.
FIG. 7.
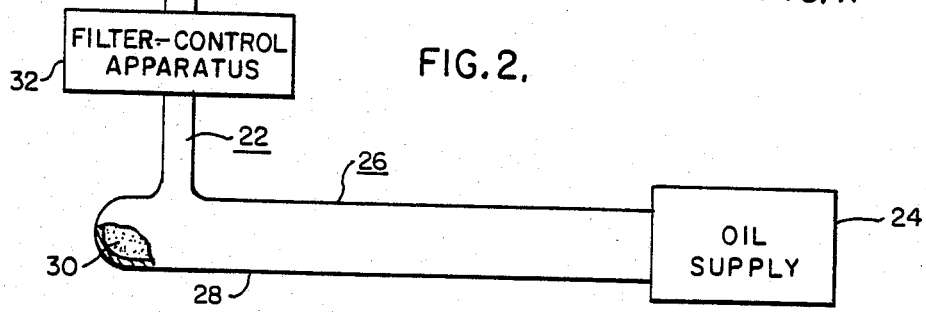

BEARING OIL SUPPLY FILTER-CONTROL APPARATUS FOR A ROTATING MACHINE

BACKGROUND OF THE INVENTION

This invention relates generally to rotating machines, such as turbines and generators, and in particular, to an apparatus for protecting the bearings used in such machines from damaging particles contained in the oil supply to the bearings. A problem often encountered today, especially by utilities and others having machinery with large rotating shafts, is damage to the bearings supporting the shaft journals and the shaft journals as a result of metallic or other damaging particles in the oil supply to the bearings. Many years ago, screens were installed in the oil supply line in an attempt to prevent the damaging particles from reaching the bearings, but difficulties were encountered with these screens in that they would become clogged and often would result in bearings being damaged from lack of oil supply.

SUMMARY OF THE INVENTION

The present invention provides a retrofit bearing means oil supply filter-control apparatus for a rotating machine. Such a machine typically includes a rotating shaft having a journal at each end thereof. Bearing means positioned adjacent to the journal. The journal is supported by and rotates within the bearing to permit ease of rotation of the shaft. The bearing means typically includes a metallic shell lined with babbitt adjacent to the journal. The machine further includes a bearing means oil supply system including an oil supply, pipe means in fluid communication between the oil supply and the bearing means.

The apparatus of the present invention comprises a hollow flow-control block means. The flow-control means includes a side wall portion. The side wall portion has an inlet passing therethrough in fluid communication with the oil supply. The side wall portion has an outlet passing therethrough in fluid communication with the bearing means. The flow-control means has a substantially cylindrical central cavity therein of predetermined size. The inlet and the outlet are positioned and enter the central cavity on opposite sides thereof. The inlet and outlet are of substantially horizontal and vertical alignment with one another. The flow-control means includes a bottom portion. The bottom of the central cavity is defined by the interior wall of the bottom portion. The bottom of the central cavity being a predetermined distance lower than the lowest portions of the inlet and the outlet.

The flow-control block means further includes a top portion. The top portion has a top aperture passing through the top portion. The top aperture has a predetermined diameter greater than the diameter of the central cavity. The flow control means has an interior edge member defined by the juncture of the top aperture with the central cavity. A removable plug means engageable in the top aperture of the flow control means is provided.

The apparatus further includes a removable oil flush deflector means. The oil flush deflector means comprises a first hollow cylindrical canister member of predetermined size to fit within the central cavity. The first hollow cylindrical canister member has first side wall means substantially sealing the outlet from the central cavity. The first side wall means has a first wall opening therethrough of predetermined size in fluid communication with the inlet when the deflector means is operable in the central cavity. A first lip member is provided affixed to the top edge of the first canister member. The first lip member rests on the interior edge member when the oil flush deflector means is operably inserted in the central cavity of the flow control means. The canister has a first base member positioned a predetermined distance below the inlet when the flush deflector means is operably inserted in the cavity, whereby when the deflector means is operable in the central cavity during flushing of the oil system, the oil is prevented from flowing to the bearing means.

The apparatus further includes a removable oil filter means comprising a second hollow cylindrical canister member. The second canister member is of predetermined size to fit within the central cavity. The second canister has second side wall means. The second side wall means has a second wall opening therethrough of predetermined size and shape. The second opening is in fluid communication with the inlet when the second canister is operably positioned in the central cavity. The second side wall means has a third wall opening therethrough of predetermined size and shape. The third wall opening is in fluid communication with the outlet when the second canister is operably positioned in the central cavity. The second canister has a second base member positioned a predetermined distance below the inlet and the outlet when the oil filter means is operably inserted in the cavity. A second lip member is provided affixed to the top edge of the second canister. The second lip member rests on the interior edge member when the oil filter is operably inserted in the central cavity of the flow control means. Deflector plate means of predetermined size and shape is affixed to and housed within the second cylindrical canister, whereby during normal operation of the rotating machine, damaging hard particles are deflected by the deflector plate means to fall to the bottom of the canister thereby preventing the damaging hard particles from flowing to the bearings.

Preferably, the deflector plate means is substantially vertically positioned within the second canister midway between the second opening and the third opening. The deflector plate means preferably has a height substantially equal to the distance extending from the second base member of the second canister to about 3/4 the height of the inlet. Also, the deflector plate means preferably has fourth aperture means of predetermined size and shape therethrough in predetermined position. Other preferred embodiments of the invention are also disclosed.

BRIEF DESCRIPTION OF THE DRAWINGS

For a better understanding of the invention, reference may be had to the accompanying drawings, in which:

FIG. 1 is a schematic diagram showing a portion of the oil supply system connected to the bearing means of a rotating shaft;

FIG. 2 is a cross-sectional elevational view of the hollow flow-control means connected to the oil supply system;

FIG. 7 is a cross-sectional plan view of the hollow flow control means showing the removable oil filter means operably inserted therein, partially broken away taken along the line B—B of FIG. 4.

DESCRIPTION OF THE PREFERRED EMBODIMENTS

Figure 3:
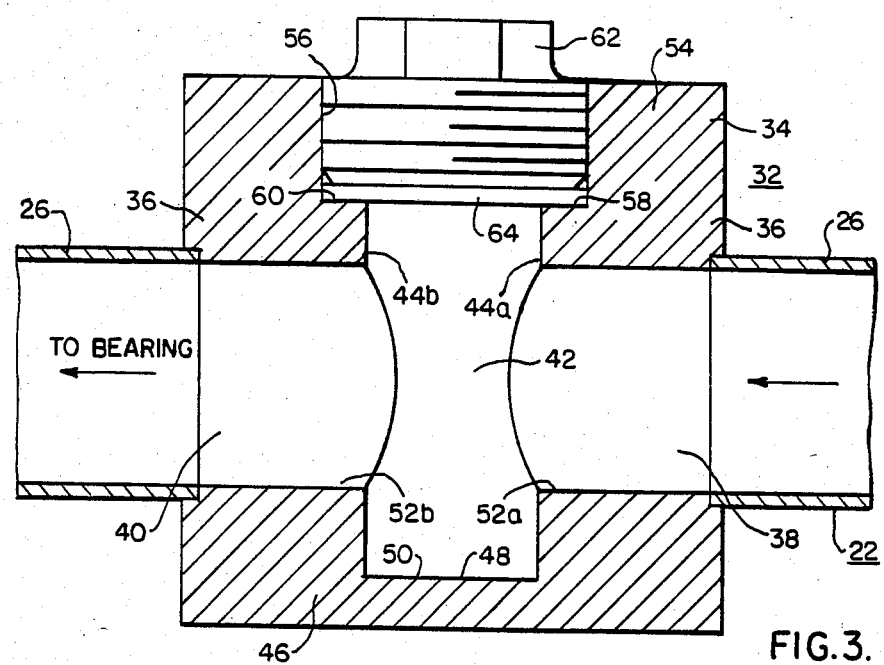
FIG. 3 is a cross-sectional elevational view of the hollow flow control block means in fluid communication with the oil supply and bearing means.

With reference to FIG. 1 there is shown schematically a rotating machine 10 such as a turbine or generator. The machine includes a rotating shaft 12 having a journal 13 at each end thereof which can be of various diameters. Bearing means 14 is positioned adjacent to the shaft journal 12. The shaft journal 13 rides on and is supported by the bearing means 14 to permit ease of rotation of the shaft as is known in the art. Typically, the bearing means includes a bearing pedestal 16. The bearing pedestal has a bearing shell 18 thereon. A babbitt 20 typically made of soft metal is housed inside the bearing shell 18 to protect the shaft journal 13 from scoring. The shaft journal in large turbines, for example resides on an oil filter between the journal 13 and babbitt 20. The machine 10 further includes a bearing means oil supply system 22 including an oil supply 24, and pipe means 26 in fluid communication between the oil supply 24 and the bearing means 14. In a typical oil supply system, there is a header pipe 28 of a large diameter such as 8 inches shown schematically in FIG. 1 which feeds into smaller diameter pipes leading to the bearing means 14. As shown in FIG. 1, the header pipe 28 often has a dead end 30 where damaging particles such as heavy metallic particles may tend to build up during operation of the oil system 22 because of the flow characteristics in the system. When the system is shut down and then restarted, it has been found that these damaging particles may be re-entrained in the oil flow going to the bearing means 14. The damaging particles, which may be in the form of metallic flakes, often become lodged between the babbitt 20 and the journal 13 often resulting in drying out of the bearing and ultimate failure of the bearing means 14 with also possible damage to the journal 13.

With reference to FIG. 2, the retrofit bearing means oil supply filter-control apparatus 32 of the present invention is for retrofit installation in fluid communication with an existing oil supply system 22 as shown in FIG. 2, for example. The apparatus 32 as shown in FIGS. 3-7 comprises a hollow flow-control block means 34 which can be made of steel, for example. The flow-control block means 34 includes a side wall portion 36. The side wall portion 36 has an inlet 38 passing therethrough in fluid communication with the oil supply system 22. The side wall portion 36 also has an outlet 40 passing therethrough in fluid communication with the bearing means 14.

The flow-control means 32 has a substantially cylindrical central cavity 42 therein of predetermined size such as 4.00" for example. The inlet 38 and the outlet 40 are positioned on opposite sides 44a, 44b of the central cavity. The inlet 38 and the outlet 40 are of substantially equal cross-sectional size and shape such as being circular with a diameter of 4.00" for example. The inlet 38 and the outlet 40 are also in substantial vertical and horizontal with one another. Flow-control means includes a bottom portion 46. The bottom portion 46 has an interior wall 48. The bottom 50 of the central cavity 42 is defined by the interior wall 48 of the bottom portion 46. The bottom 50 of the central cavity is a predetermined distance such as 3⅞" lower than the lowest portions 52a, 52b of the inlet 38 and the outlet 40.

The flow-control block means 34 includes the top portion 54. The top portion 54 has a top aperture 56 passing therethrough. The top aperture 56 is a predetermined diameter greater than the diameter of the central cavity 42. For example, the top aperture is 6.00 inches in diameter and the central cavity is 4.00" inches in diameter. The flow control means 34 has an interior edge member 58 defined by the juncture 60 of the top aperture 56 with the central cavity 42. A removable plug means 62 is provided engageable in the top aperture 56. Threading means 57 is preferably provided in the top portion 54 adjacent the top aperture 56. As shown in FIG. 3, a space 64 remains in the top aperture 56 after the removable plug 62 is engaged in the top aperture. The plug 62 may be threaded as shown in FIG. 3. The flow-control means 34 may be retrofitted into an existing oil supply system 22, for example. Preferably, the flow-control means is placed as close to the bearing means 14 as possible. Of course, the flow-control means 34 may also be installed in a new oil supply system.

Figure 4:
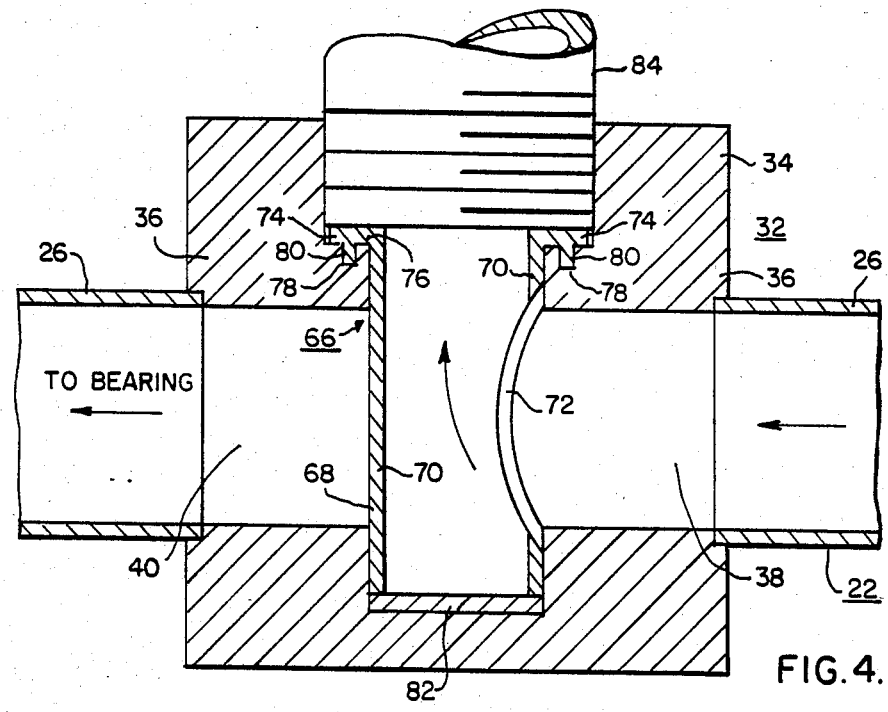
FIG. 4 is a cross-sectional elevational view of the hollow flow block control means with the removable oil flush deflector means operably inserted.

The apparatus 32 of the present invention also comprises a removable flush deflector means 66. The oil flush deflector 66 comprises a first hollow cylindrical canister member 68 as shown in FIG. 4. First canister member 68 is of predetermined size such as 3.995" to fit within the central cavity 42. The first canister member 68 has first side wall means 70 substantially sealing the outlet 40 from the central cavity 42 when the deflector means 66 is operable in the central cavity 42. The first side wall means 70 has a first wall opening 72 therethrough of predetermined size such as 4.00" in fluid communication with the inlet 38 when the deflector 66 is operable in the central cavity. A first lip member 74 is affixed to the top edge 76 of the first canister 68. The first lip 74 rests on the interior edge member 58 when the oil flush deflector 66 is operably inserted in the central cavity 42. Preferably, the fourth aperture means 78 of predetermined diameter and depth are positioned through said edge member 58 and the lip member 74 is preferably provided with locating lug means 80 for properly positioning the deflector 66 in the central cavity. The clearance between the first side wall 70 of the first canister 68 and the side wall portion 36 of the fluid-control means 34 should not be greater than 0.005". The first canister 68 preferably has a first base member 82 positioned a predetermined distance such as 3.00" below the lowest portion 52a of the inlet 38 when the oil flush deflector 66 is operably inserted in the cavity 42, whereby when the deflector 66 is operable in the central cavity 42 during flushing of the oil system, the oil is prevented from flowing to the bearing means 14. During flushing of the oil system, the removable plug 62 is not engaged in the top aperture 56, but a pipe nipple 84 may be screwed down against the deflector 66 holding nit firmly in place. The deflector 66 may be used in either the forward or reverse flow flushing method.

Figure 5:
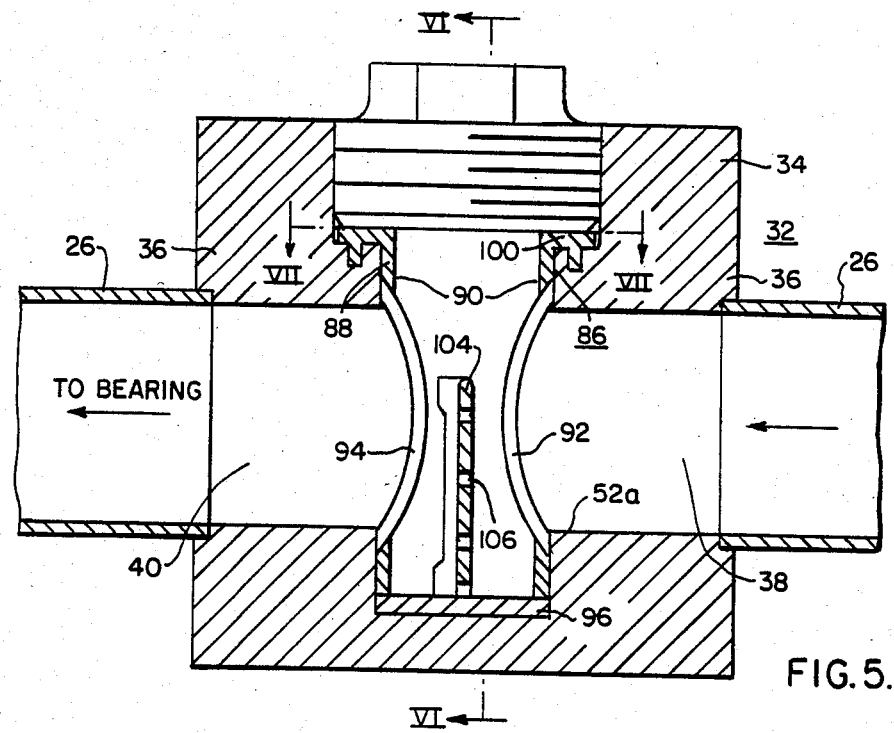
FIG. 5 is a cross-sectional side elevational view of the hollow flow control means with the removable oil filter means operably inserted.
Figure 6:
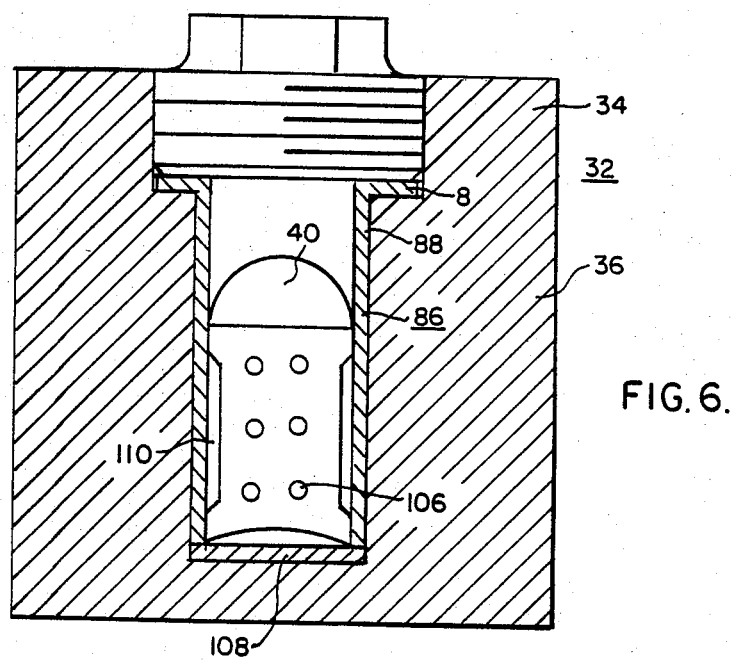
FIG. 6 is a cross-sectional side elevational view of the hollow flow control means with the removable oil filter means operably inserted taken along line A-A of FIG. 4.

Referring to FIGS. 5-7, a removable oil filter means 86 is provided comprising a second hollow cylindrical canister member 88. The second hollow canister 88 is of predetermined size such as 3.995" to fit within the central cavity 42. Preferably, the clearance between the second canister 88 and the side wall portion 36 is not greater than 0.005". The second canister 88 has second side wall means 90. The second side wall means 90 has a second wall opening 92 therethrough of predetermined size and shape such as being circular with a diameter of 4.00". The second opening 92 is in fluid communication with the inlet 38 when the second canister is operably positioned in the central cavity 42. The second side wall means also has a third wall opening 94 therethrough of predetermined size and shape such as circular with a diameter of 4.00", for example. The third wall opening 94 is in fluid communication with the outlet 40 when the second canister 88 is operably positioned in the central cavity 42. The second canister 88 has a second base member 96 affixed to the second side wall means 90 and positioned a predetermined distance such as below the lowest portion 52a of the inlet 38 when the oil filter means 86 is operably positioned in the central cavity 42. A second lip member 100 affixed to the top edge 102 of the second side wall means 90. A second lip member 100 rests on the interior edge member 58 when the oil filter means is operably positioned in the central cavity 42 of the flow-control means 34. A deflector plate means 104 of predetermined size and shape is affixed to and housed within the second cylindrical canister 88, whereby during normal operation of the rotating machine, damaging particles are deflected by the deflector plate means 10 to fall to the second base 96 of the second canister 88 thereby preventing the damaging particles from flowing to the bearing means 14. Preferably, the deflector plate 104 is affixed to the second base member 96 and is substantially vertically positioned in the second canister substantially midway between the second wall opening 92 and the third wall opening 94. Preferably, the deflector plate 104 has a height from the second base member 96 of the second canister 88 to about ¾ the height of the inlet 38 in the horizontal plane and is provided with fourth aperture means 106 of predetermined size and shape therethrough in predetermined positions such as shown in FIG. 6 where the fourth apertures consist of six circular apertures having a diameter of 1/32" for example. Preferably, a bottom gap means 108 is formed between the deflector plate 104 and the second base member 96 of the second canister 88. A bottom gap means 108 is of predetermined size and shape such as 1/16" and curved, for example. Side gap means 110 is desirably included of predetermined size and shape such as 1/16" and is formed between the deflector plate 104 and the second base member 96 of the second canister 88. The fourth aperture means 106, bottom gap 108 and side gap 110 permit oil flow in the second cannister 88 but while trapping any damaging particles on or near the second base 96 of the second cannister 88. It has been found that particles will flow through bottom gap 108 and side gap 110 but remain trapped near base 96. Thus, the bottom gap 108 and side gap 110 permit more particles to be trapped in second cannister 88.

Utilizing the present invention, costly downtime and expense for rehabilitation such as re-babbitting bearings which may cost $10,000 per bearing, for example, is avoided. If a bearing is seriously damaged, new bearings typically cost from $30,000 to $60,000 depending upon the size. The retrofit capability of the present invention allows for existing systems for upgraded simply by cutting through existing pipe and installing the apparatus 32 of the present invention. Also, bearings are generally required to be taken out and cleaned anda then re-installed during an oil flush of the system. Utilizing the present invention eliminates an oil flush through the bearings. For a utility utilizing the present invention, the feature of not having to remove the bearings during oil flush would save about a day's time resulting in a savings of approximately $80,000 to $100,000 because of the power sales lost. The present invention may be installed during short outages for boiler work, for example, on weekends as part of general maintenance.

I claim:

1. A retrofit bearing means oil supply filtercontrol apparatus for a rotating machine, said machine including a rotating shaft having a journal at each end thereof, bearing means positioned adjacent to said shaft journal, said journal supported by and riding on said bearing means to permit ease of rotation of said shaft, a bearing means oil supply system including an oil supply, pipe means in fluid communication between said oil supply and said bearing means, said apparatus in fluid communication with said oil supply system, said apparatus comprising:

a hollow flow-control block means, said flow-control block means including a side wall portion, said side wall portion having an inlet passing therethrough in fluid communication with said oil supply system, said side wall portion having an outlet passing therethrough in fluid communication with said bearing means, said flow-control means having a substantially cylindrical central cavity therein of predetermined size, said inlet and said outlet positioned on opposite sides of said central cavity, said inlet and said outlet of substantially equal cross-sectional size and shape and in substantial vertical alignment with one another, said flow-control means includes a bottom portion, said bottom portion making an interior wall, the bottom of said central cavity defined by said interior wall of said bottom potion, the bottom of said central cavity being a predetermined distance lower than the lowest portions of said inlet and said outlet, said flow-control means including a top portion, said top portion having a top aperture passing through said portion, said top aperture of predetermined diameter greater than the diameter of said central cavity, said flow-control means having an interior edge member defined by the juncture of said top aperture with said central cavity, removable plug means engageable in said top aperture of said flow-control means;

a removable oil flush deflector means, said oil flush deflector means comprising a first hollow cylindrical canister member of predetermined size to fit within said central cavity, said first hollow cylindrical canister member having first side wall means substantially sealing said outlet from said central cavity when said deflector means is operable in said central cavity, said first side wall means having a first wall opening therethrough of predetermined size in fluid communication with said inlet when said deflector means is operable in said central cavity, a first lip member affixed to the top edge of said first canister member, said first lip member resting on said interior edge member when said oil flush deflector means is operably inserted in said central cavity of said flow control means, said first canister having a first base member positioned a predetermined distance below said lowest portion of the inlet when said flush deflector means, is operably inserted in said cavity, whereby when said deflector means is operable in said central cavity during flushing of said oil system, said oil is prevented from flowing to said bearing means;

a removable oil filter means comprising a second hollow cylindrical canister member, said second canister member of predetermined size to fit within said central cavity, said second canister having second side wall means, said second side wall means having a second wall opening therethrough of predetermined size and shape, said second opening in fluid communication with said inlet when said second canister is operably positioned in said central cavity, said second side wall means having a third wall opening therethrough of predetermined size and shape, said third wall opening in fluid communication with said outlet when said second canister is operably positioned in said central cavity, said second canister having a second base member affixed to the second side wall means, and positioned a predetermined distance below said lowest portion of said inlet when said oil filter means is operably positioned in said cavity, a second lip member affixed to the top edge of said second side wall means, said second lip member resting on said interior edge member when said oil filter means is operably positioned in said central cavity of said flow control means, deflector plate means of predetermined size and shape affixed to and housed within said second cylindrical canister, whereby during normal operation of said rotating machine, damaging metallic particles are deflected by said deflector plate means to fall to the second base member of said second canister thereby preventing said damaging metallic particles from flowing to said bearing means.

2. The apparatus of claim 1, wherein said deflector plate means is affixed to said second base member and substantially vertically positioned in said second canister substantially midway between said second wall opening and said third wall opening.

3. The apparatus of claim 2, wherein said deflector plate means has a height substantially equal to the distance from said second base member of said second canister to about ¾ the height of said inlet.

4. The apparatus of claim 1, wherein said deflector plate means has a predetermined curvature in the horizontal plane.

5. The apparatus of claim 1, wherein said deflector plate means has fourth aperture means of predetermined size and shape therethrough in predetermined position.

6. The apparatus of claim 1, wherein bottom gap means of predetermined size and shape is formed between said deflector plate and aid second base of said second canister.

7. The apparatus of claim 1, wherein a side gap means of predetermined size and shape is formed between said deflector plate and said second base of said second canister.

* * * * *